(12) United States Patent
Lim et al.

(10) Patent No.: US 8,098,456 B2
(45) Date of Patent: Jan. 17, 2012

(54) PERPENDICULAR MAGNETIC RECORDING HEAD HAVING A TAPERED MAIN POLE

(75) Inventors: Chee-kheng Lim, Suwon-si (KR); Yong-su Kim, Seoul (KR); Hoo-san Lee, Osan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 703 days.

(21) Appl. No.: 11/413,000

(22) Filed: Apr. 28, 2006

(65) Prior Publication Data

US 2006/0256473 A1 Nov. 16, 2006

(30) Foreign Application Priority Data

Apr. 28, 2005 (KR) .................. 10-2005-0035536

(51) Int. Cl.
*G11B 5/127* (2006.01)
(52) U.S. Cl. ............... 360/125.13; 360/123.14
(58) Field of Classification Search ............. 360/125.01, 360/105.02, 125.08, 125.12, 125.14, 123.09, 360/123.05, 125.09, 125.1, 125.13, 125.11, 360/125.15; 29/603.07
See application file for complete search history.

(56) References Cited

U.S. PATENT DOCUMENTS

| | | | | |
|---|---|---|---|---|
| 4,763,215 A | * | 8/1988 | Gueugnon et al. | 360/125.13 |
| 4,921,508 A | * | 5/1990 | Nonaka | 29/603.15 |
| RE33,949 E | * | 6/1992 | Mallary et al. | 360/110 |
| 5,555,482 A | * | 9/1996 | McNeil | 360/119.05 |
| 5,995,343 A | * | 11/1999 | Imamura | 360/125.53 |
| 6,327,116 B1 | * | 12/2001 | Watanabe et al. | 360/125.65 |
| 6,441,995 B1 | * | 8/2002 | Sasaki | 360/125.65 |
| 6,501,619 B1 | * | 12/2002 | Sherrer et al. | 360/125.03 |
| 6,639,754 B2 | * | 10/2003 | Taguchi et al. | 360/125.12 |
| 6,693,768 B1 | * | 2/2004 | Crue et al. | 360/125.12 |
| 6,710,972 B1 | * | 3/2004 | Mochizuki et al. | 360/123.05 |
| 6,710,973 B2 | * | 3/2004 | Okada et al. | 360/125.13 |
| 6,798,615 B1 | * | 9/2004 | Litvinov et al. | 360/125.17 |
| 6,833,975 B2 | * | 12/2004 | Fukazawa et al. | 428/828 |
| 6,876,519 B1 | * | 4/2005 | Litvinov et al. | 360/125.15 |
| 6,934,128 B2 | * | 8/2005 | Tsuchiya et al. | 360/317 |
| 6,950,277 B1 | * | 9/2005 | Nguy et al. | 360/125.14 |
| 7,002,775 B2 | * | 2/2006 | Hsu et al. | 360/125.03 |
| 7,038,881 B2 | * | 5/2006 | Ito et al. | 360/125.14 |
| 7,093,348 B2 | * | 8/2006 | Sasaki | 29/603.13 |
| 7,120,988 B2 | * | 10/2006 | Le et al. | 29/603.07 |

(Continued)

FOREIGN PATENT DOCUMENTS

JP 62-057111 A 3/1987

(Continued)

*Primary Examiner* — Brian Miller
(74) *Attorney, Agent, or Firm* — Sughrue Mion, PLLC

(57) ABSTRACT

A perpendicular magnetic recording head including: a data recording module comprising a main pole, a return pole, and a coil wrapped around the main pole; and a data reproduction module including magnetic shield layers and a reading device located between the magnetic shield layers, wherein the width of a lower end of the main pole is gradually reduced in a downward direction thereof, and the lower end of the main pole comprises a first part and a second part extending from the first part, the first part having a curved surface of a first curvature and the second part having a curved surface of a second curvature. The first curvature can be equal to or different from the second curvature, and magnetic shield devices can be further disposed on both sides of the lower end of the main pole.

18 Claims, 6 Drawing Sheets

U.S. PATENT DOCUMENTS

| | | | |
|---|---|---|---|
| 7,133,252 B2 * | 11/2006 | Takano et al. | 360/125.13 |
| 7,133,253 B1 * | 11/2006 | Seagle et al. | 360/125.65 |
| 7,199,973 B2 * | 4/2007 | Lille | 360/123.09 |
| 7,245,454 B2 * | 7/2007 | Aoki et al. | 360/125.1 |
| 7,369,360 B2 * | 5/2008 | Vas'ko et al. | 360/125.12 |
| 7,372,664 B1 * | 5/2008 | Mallary et al. | 360/125.01 |
| 7,379,269 B1 * | 5/2008 | Krounbi et al. | 360/125.01 |
| 7,440,229 B2 * | 10/2008 | Sasaki et al. | 360/125.22 |
| 7,450,349 B2 * | 11/2008 | Nishida et al. | 360/319 |
| 7,454,828 B2 * | 11/2008 | Dulay et al. | 29/603.16 |
| 7,558,019 B2 * | 7/2009 | Le et al. | 360/125.06 |
| 7,580,222 B2 * | 8/2009 | Sasaki et al. | 360/125.06 |
| 7,796,360 B2 * | 9/2010 | Im et al. | 360/125.13 |
| 2002/0024755 A1 * | 2/2002 | Kim et al. | 360/55 |
| 2002/0034043 A1 * | 3/2002 | Okada et al. | 360/125 |
| 2002/0039254 A1 * | 4/2002 | Taguchi et al. | 360/125 |
| 2002/0176214 A1 * | 11/2002 | Shukh et al. | 360/317 |
| 2003/0137779 A1 * | 7/2003 | Santini et al. | 360/317 |
| 2003/0151850 A1 * | 8/2003 | Nakamura et al. | 360/125 |
| 2005/0068669 A1 * | 3/2005 | Hsu et al. | 360/125 |
| 2005/0162778 A1 * | 7/2005 | Kimura et al. | 360/126 |
| 2005/0185340 A1 * | 8/2005 | Kobayashi | 360/126 |
| 2005/0237665 A1 * | 10/2005 | Guan et al. | 360/125 |
| 2005/0280936 A1 * | 12/2005 | Sasaki et al. | 360/126 |
| 2006/0002017 A1 * | 1/2006 | Taguchi et al. | 360/125 |
| 2006/0044677 A1 * | 3/2006 | Li et al. | 360/122 |
| 2006/0203384 A1 * | 9/2006 | Maruyama et al. | 360/126 |
| 2007/0146931 A1 * | 6/2007 | Baer et al. | 360/126 |
| 2010/0146773 A1 * | 6/2010 | Li et al. | 29/603.07 |

FOREIGN PATENT DOCUMENTS

| | | | |
|---|---|---|---|
| JP | 08287414 A | * | 11/1996 |
| JP | 2000-030217 A | | 1/2000 |
| JP | 2002197609 A | * | 7/2002 |
| JP | 2002-197609 A1 | | 12/2002 |
| JP | 2003-036503 A | | 2/2003 |
| JP | 2004-127480 A | | 4/2004 |
| JP | 2004-234728 A | | 8/2004 |

* cited by examiner

PERPENDICULAR MAGNETIC RECORDING HEAD HAVING A TAPERED MAIN POLE

CROSS-REFERENCE TO RELATED PATENT APPLICATION

This application claims priority from Korean Patent Application No. 10-2005-0035536, filed on Apr. 28, 2005, in the Korean Intellectual Property Office, the disclosure of which is incorporated herein in its entirety by reference.

BACKGROUND OF THE INVENTION

1. Field of the Invention

The present invention relates to a data recording head and, more particularly, to a perpendicular magnetic recording head.

2. Description of the Related Art

The popularization of Internet has brought about a rapid increase of the amount of shared information between individuals and/or organizations. Thus, many Internet users are interested in personal computers (PCs) with high data processing speed and data storage capacity.

CPU chips and computer peripherals have been improved to increase the data processing speed, and various types of recording media, for instance, hard disks, have been introduced to increase the data storage capacity.

While recording media using a ferroelectric layer as a data recording layer have been recently introduced, most recording media still use a magnetic layer as a data recording layer.

Data recording methods for magnetic recording media are largely divided into longitudinal magnetic recording methods and perpendicular magnetic recording methods.

In the former data is recorded using a magnetic layer with a magnetic polarization horizontally arranged on the surface thereof, and in the latter data is recorded using a magnetic layer with magnetic polarization perpendicularly arranged on the surface thereof.

Considering the data recording density, the perpendicular magnetic recording method is better than the horizontal magnetic recording method.

A process of recording data on a magnetic layer can be considered as an interaction between the magnetic layer and a magnetic head. Thus, to record data with high density on a magnetic layer, improvements of both the magnetic heads and the magnetic layer are required.

Recently, as the perpendicular magnetic recording method draws more attention along with the development of information technology, various types of magnetic heads for the perpendicular magnetic recording method have been introduced.

A conventional magnetic head used in the perpendicular magnetic recording method basically includes a main pole and a return pole, to record data on a magnetic layer, and a magneto-resistive (MR) device to read data recorded on the magnetic layer.

If the track density of the magnetic layer is increased using the perpendicular magnetic recording method, data recording density of the magnetic layer can further increase. However, an increase of the track density of the magnetic layer causes a decrease in track pitch. Thus, the size of the conventional magnetic pole width is reduced in proportion to the decrease in track pitch.

However, in the case of the conventional magnetic head, much flux leakage is generated in the track direction according to a skew angle. Due to this, during the process of recording data on a selected track of the magnetic layer using the conventional magnetic head, undesired data can be recorded on unselected tracks.

To reduce power consumption and heat generation in the magnetic recording head, the current passing through the magnetic recording head for recording data should be lowered.

SUMMARY OF THE INVENTION

The present invention provides a perpendicular magnetic recording head that reduces the data recording current, increase the track density of the recording medium, and prevent or minimize the flux leakage due to a skew angle effect.

According to an aspect of the present invention, there is provided a perpendicular magnetic recording head comprising: a data recording module comprising a main pole, a return pole, and a coil wrapped around the main pole; and a data reproduction module comprising magnetic shield layers and a reading device located between the magnetic shield layers, wherein the width of a lower end of the main pole is gradually reduced in a downward direction thereof, and the lower end of the main pole comprises a first part and a second part extending from the first part, the first part having a curved surface of a first curvature and the second part having a curved surface of a second curvature.

Magnetic shield devices may be further disposed on both sides of the lower end of the main pole.

The first curvature may be equal to or different from the second curvature.

The width of the lower end of the second part may be below 100 nm.

The first part and the second part may be of the same or of different magnetic materials.

The first curvature is such that the width of the first part decreases at a decreasing rate in a direction approaching the second part from the first part.

The strength and gradient of a magnetic field between the main pole in the perpendicular magnetic recording head and a recording medium are greater according to one aspect of the present invention than those in the prior art. Thus, the use of the perpendicular magnetic recording head according this aspect of the present invention can largely reduce the current required for recording data. In addition, the flux leakage due to a skew angle effect can be prevented or minimized. Accordingly, data can be recorded only on a selected track of a recording medium, and even if undesired data is recorded on unselected tracks, this can be minimized. In addition, linear bit density and track density can be increased.

BRIEF DESCRIPTION OF THE DRAWINGS

The above and other features and aspects of the present invention will become more apparent by describing in detail non-limiting, exemplary embodiments thereof with reference to the attached drawings in which.

DETAILED DESCRIPTION OF THE INVENTION

A perpendicular magnetic recording head (hereinafter, a magnetic head) according to non-limiting, exemplary embodiments of the present invention will now be described more fully with reference to the accompanying drawings. The thickness of layers or areas is exaggerated for clearness of the specification.

Figure 1:
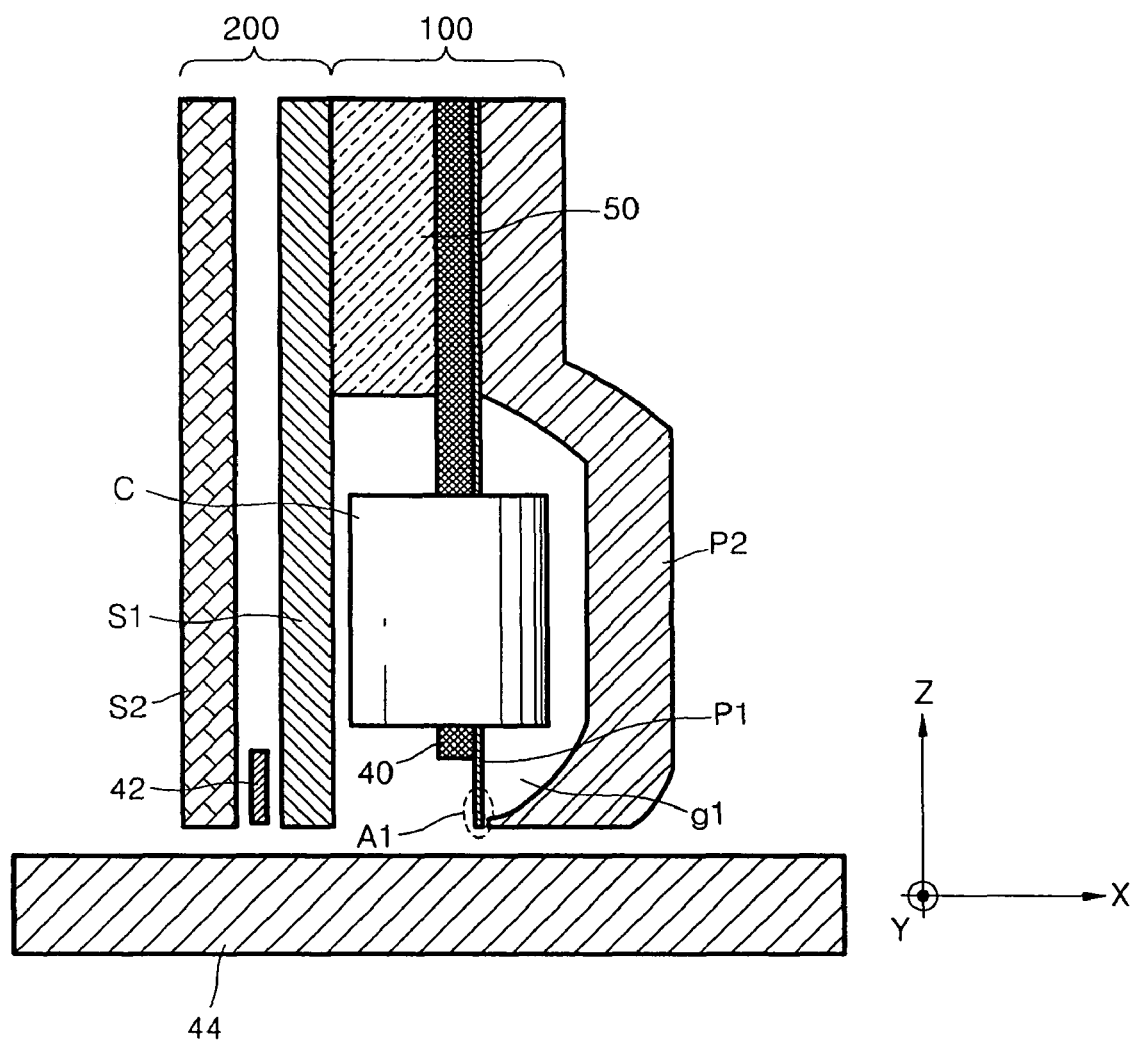
FIG. 1 is a sectional plan view of a perpendicular magnetic recording head according to an exemplary embodiment of the present invention.

FIG. 1 is a sectional plan view of a core part of a magnetic head according to an exemplary embodiment of the present invention.

Referring to FIG. 1, the magnetic head includes a recording module 100 for recording data on the recording medium 44 and a reproduction module 200 for reading data recorded on the recording medium 44.

The recording module 100 includes a main pole P1, a return pole P2, a complementary pole 40, and a coil C. The main pole P1, the return pole P2, and the complementary pole 40 can be made of the same material, for instance, NiFe, but the saturation magnetic moments thereof may be different from one another by using different amounts of the material. For example, the saturation magnetic moment of the main pole P1 may be greater than the saturation magnetic moment of the complementary pole 40. The main pole P1 and the return pole P2 are directly used to record data on the recording medium 44. The complementary pole 40 focuses the magnetic field generated by the main pole P1 when recording data in a selected area of the recording medium 44. The main pole P1 has a predetermined width. The return pole P2 is located at one side of the main pole P1, and the complementary pole 40 is located at other side of the main pole P1. The complementary pole 40 is attached to the main pole P1. The complementary pole 40 is recessed by a predetermined depth in the upward direction from a lower end of the main pole P1. That is, a lower end of the complementary pole 40 is located at a higher position than the lower end of the main pole P1. The coil C is wrapped around the main pole P1 and the complementary pole 40. A gap g1 exists between the lower end of the main pole P1 and the lower end of the return pole P2. The gap g1 extends to the upper end of the main pole P1 and the upper end of the return pole P2, and increases between the intermediate parts of the main pole P1 and the return pole P2. The coil C passes through the gap between the intermediate parts of the main pole P1 and the return pole P2. The upper ends of the main pole P1 and the return pole P2 are combined to each other.

The reproduction module 200 is attached to the recording module 100, and the coil C is placed between their lower parts. The reproduction module 200 includes first and second magnetic shield layers S1 and S2 and a reading device 42 between the first and second magnetic shield layers S1 and S2. The first and second magnetic shield layers S1 and S2 prevent magnetic fields from reaching the location where data is being read. The reading device 42, for instance, may be a giant magneto-resistive (GMR) device or a tunneling magneto-resistive (TMR) device. Reference number 50 in FIG. 1 indicates an interconnecting layer.

Figure 2:
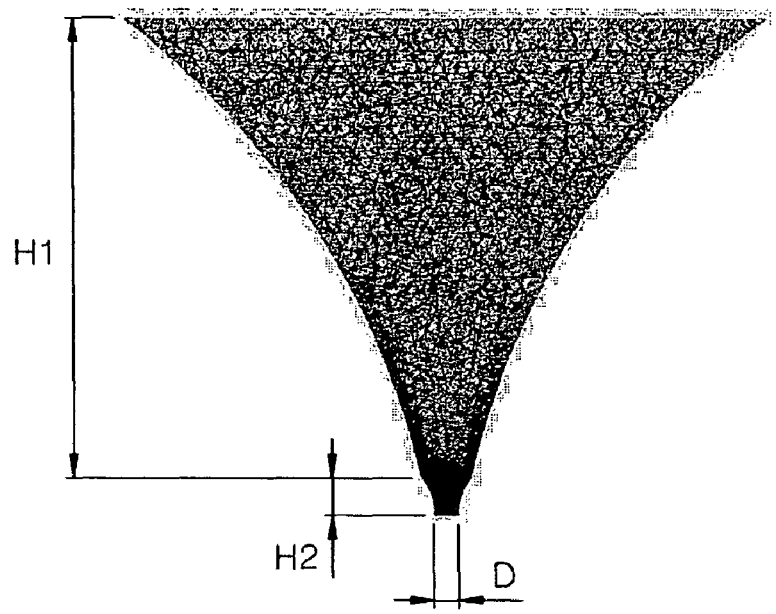
FIG. 2 is a magnified plan view of a first area A1 of FIG. 1, in a moving direction of the perpendicular magnetic recording head.

FIG. 2 shows a magnified drawing of a first area A1 of FIG. 1 viewed in a direction in which the magnetic recording head according to an exemplary embodiment of the present invention moves. Hereinafter, drawings in a direction in which the magnetic recording head moves are designated a front view.

Referring to FIG. 2, the lower end of the main pole P1 adjacent to the recording medium 44 includes two different structural parts.

In detail, the lower end of the main pole P1 includes a first part H1 and a second part H2 located below the first part H1. The first and second parts H1 and H2 are made of the same material and are continuous. The width of the first part H1 is gradually reduced in the downward direction thereof. Assuming that a line crossing perpendicularly to the lower end of the main pole P1 is a Z axis, the variation of the width of the first part H1 along the Z axis is a quadratic function for displacement of the Z axis. Thus, a side of the lower end of the main pole P1 is a symmetrically curved surface centering around the Z axis. The side of the first part H1 has a first curvature.

In the lower end of the main pole P1, the second part H2 is shorter than the first part H1. The width of the second part H2 is also gradually reduced in the downward direction thereof, and the side of the second part H2 is a curved surface. The side of the second part H2 has a second curvature. The second curvature can be equal to or different from the first curvature. The width D of the lower end of the second part H2, i.e., a part closest to the recording medium 44, is preferably as narrow as possible considering a track density of the recording medium 44, for instance, below 100 nm.

Figure 3:
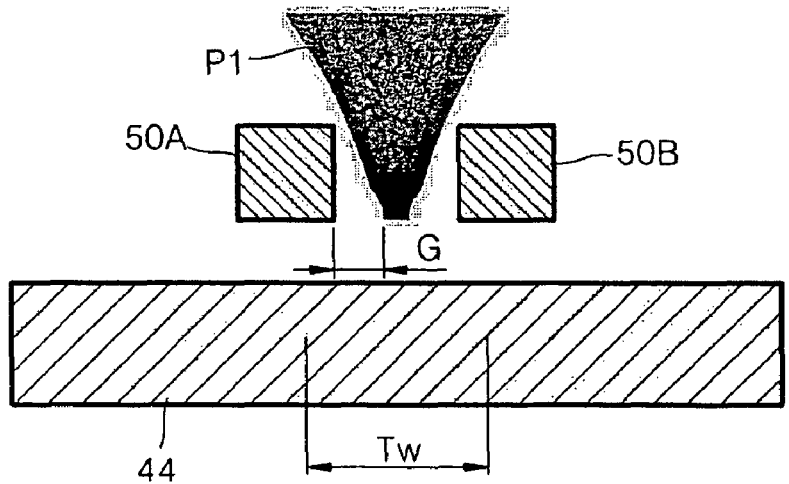
FIG. 3 is a front view of a perpendicular magnetic recording head in which magnetic shield devices are located at both sides of a main pole of the perpendicular magnetic recording head of FIG. 1 according to an exemplary embodiment of the present invention.

The magnetic head according to an embodiment of the present invention can include first and second magnetic shield devices 50A and 50B in both sides of the lower end of the main pole P1, as illustrated in FIG. 3. A gap G exists between the first or second magnetic shield devices 50A or 50B and the lower end of the second part H2 of the main pole P1. The first and second magnetic shield devices 50A and 50B prevent a magnetic field generated by the lower end of the main pole P1 from leaking away from a selected track located below the main pole P1 and arriving at unselected neighboring tracks. Reference character Tw in FIG. 3 indicates the width of the selected track located below the main pole P1.

The present inventor performed a first simulation to verify the characteristics of the magnetic head according to an exemplary embodiment.

In the first simulation, first and second magnetic heads were used as a comparative group to compare them with the magnetic head according to an exemplary embodiment of the present invention. The first and second magnetic heads are the same as the magnetic head according to the embodiment except that the shape of the lower end of each main pole is different.

Figure 5:
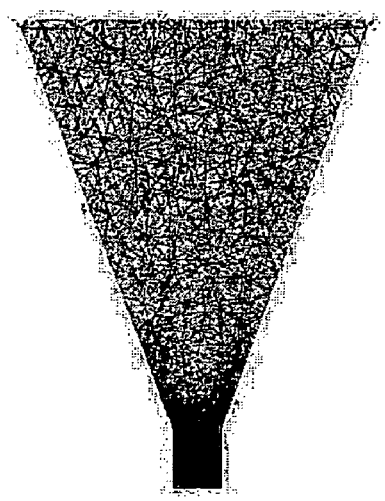
FIGS. 5 and 6 are front views of perpendicular magnetic recording heads used as a comparative group to obtain the simulation results of FIG. 4.
Figure 6:
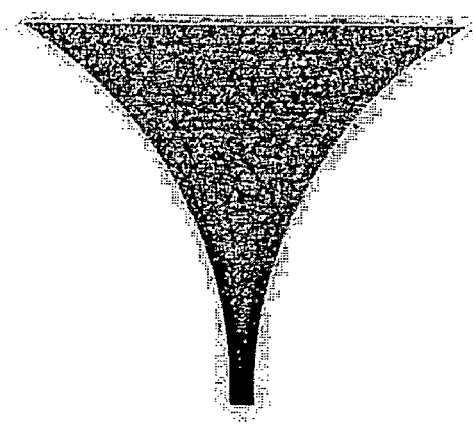

FIG. 5 illustrates the lower end of the main pole included in the first magnetic head, and FIG. 6 illustrates the lower end of the main pole included in the second magnetic head.

Referring to FIGS. 5 and 6, the shapes of the lower ends of the main poles of the first and second magnetic heads are similar to the lower end of the main pole P1 of the magnetic head according to this embodiment, but the lower end of the main pole of the first magnetic head illustrated in FIG. 5, corresponding to the first and second parts H1 and H2 of the magnetic head is different from this embodiment. In the lower end of the main pole of the second magnetic head illustrated in FIG. 6, a portion corresponding to the first part H1 of the magnetic head is the same as this embodiment, but a portion corresponding to the second part H2 of the magnetic head according to this embodiment is different.

Figure 4:
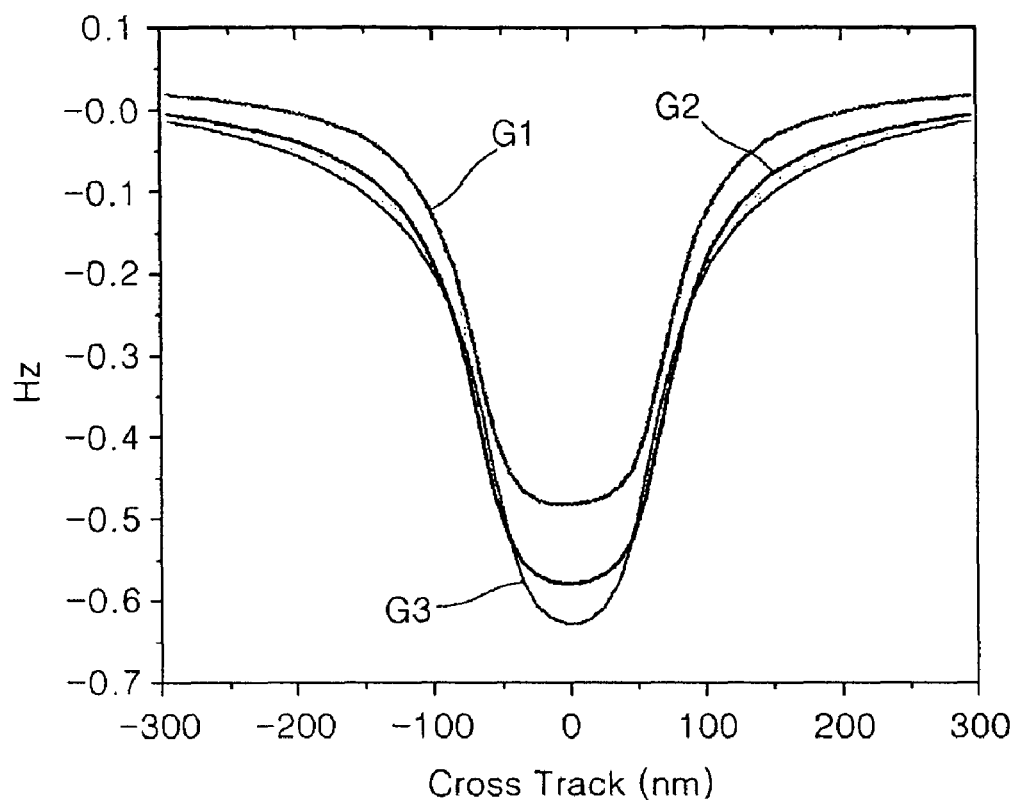
FIG. 4 is a diagram illustrating a result of a first simulation of the perpendicular magnetic recording head according to an exemplary embodiment of the present invention having the main pole of FIG. 2.

FIG. 4 is a diagram illustrating a result of the first simulation of the magnetic head according to this embodiment of the present invention and the first and second magnetic heads, showing the strength variation of the Z-axis direction component (Hz) of the magnetic field in the cross track direction (direction of traversing the tracks).

First through third graphs G1, G2, and G3 of FIG. 4 indicate results of the first simulation of the first magnetic head, the second magnetic head, and the magnetic head according to this embodiment having the main pole P1 illustrated in FIG. 2, respectively.

Comparing the first through third graphs G1, G2, and G3 to each other, the Z-axis direction magnetic field component (Hz) of the magnetic head according to this embodiment, having the main pole P1 illustrated in FIG. 2, has a greater strength, narrower width, and greater gradient than the Z-axis direction magnetic field component (Hz) of the first or second magnetic head.

This result implies that the use of the magnetic head according to this embodiment of the present invention reduces the track width of a recording medium and the effect of recording data on unselected tracks can be minimized, compared to the use of the first or second magnetic head.

The present inventor performed a second simulation of the first magnetic head and the magnetic head according to this exemplary embodiment verify the characteristics of the magnetic head according to the embodiment.

In the second simulation, the width of the lower end of the main pole of the magnetic head (refer to FIG. 5) is 120 nm, and the width D of the lower end of the main pole P1 of the magnetic head according to this embodiment is 100 nm. The Z-axis direction magnetic field component (Hz) was measured at 23 nm downward, apart from the air bearing surface of each magnetic head. A current whose field frequency is 667 MHz was used for magnetic field generation. Each magnetic field was measured for 1.5 ns. In addition, the coordinate axes illustrated in FIG. 1 and FIGS. 7 to 9 are the same.

Figure 7:
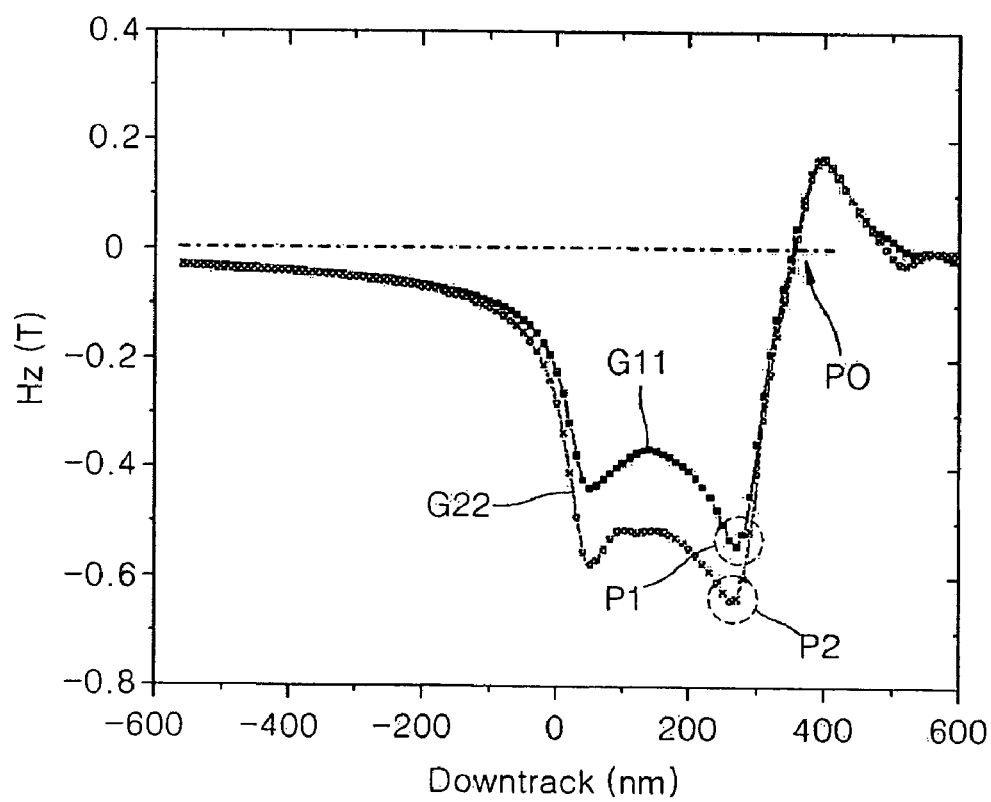
FIGS. 7 through 9 are diagrams illustrating results of a second simulation of the perpendicular magnetic recording head according to an exemplary embodiment of the present invention having the main pole of FIG. 2.
Figure 8:
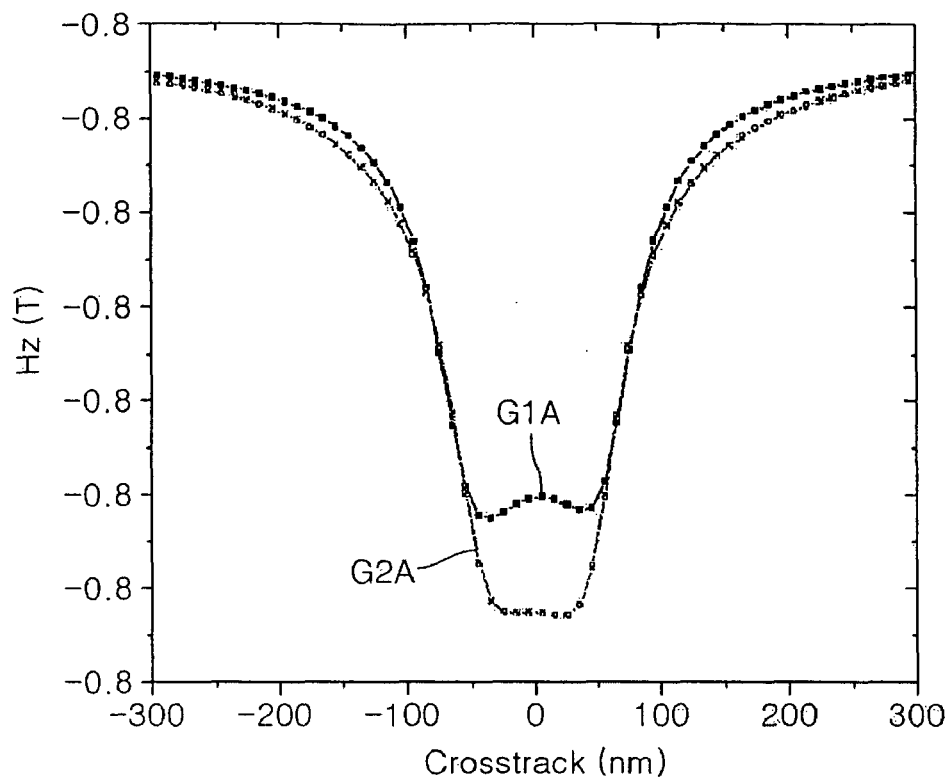
Figure 9:
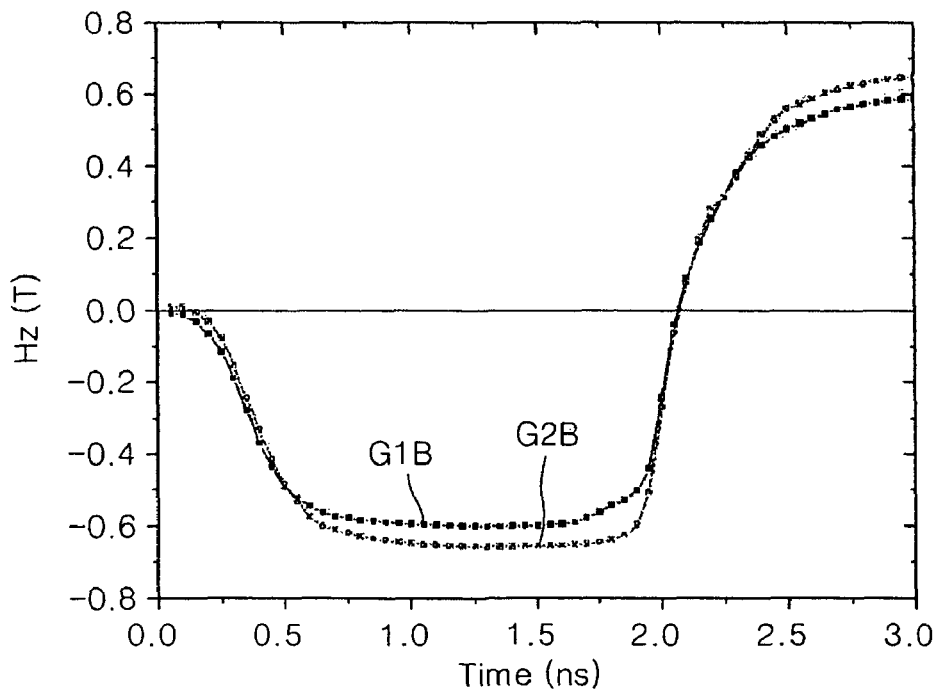

FIGS. 7 through 9 illustrate results of the second simulation.

FIG. 7 illustrates the variation in the X-axis direction, i.e., the variation in the downtrack direction, of the strength of the Z-axis component (Hz) of the magnetic field generated between each main pole and each recording medium in the magnetic head according to this embodiment and the first magnetic head.

In FIG. 7, a first graph G11 indicates a measurement result on the first magnetic head, and a second graph G22 indicates a measurement result on the magnetic head according to an embodiment of the present invention having the main pole P1 illustrated in FIG. 2.

Comparing the first and second graphs G11 and G22 to each other, the strength of the Z-axis direction magnetic field component (Hz) of the magnetic head according to this embodiment is greater than that of the first magnetic head. In particular, each of a first downpeak P1 of the first graph G11 and a second downpeak P2 of the second graph G22 indicates the strength of the Z-axis direction magnetic field component (Hz) at a position below each trailing edge, i.e., below an edge portion of the lower end of each main pole, which is close to each return pole. A position P0 at which the strength of each Z-axis direction magnetic field component (Hz) in the first and second graphs G11 and G22 is 0 is a part being begun by each return pole.

If a difference between the strength of the Z-axis direction magnetic field component (Hz) at each trailing edge and the strength of each Z-axis direction magnetic field component (Hz) at the position P0 at which each return pole begins is greater, the data recording time may be reduced, and data recording density in a given track, i.e., a linear bit density, is higher.

Thus, the result of FIG. 7 implies that the use of the magnetic head according to this embodiment of the present invention reduces the data recording time and increases the linear bit density, compared to the use of the first magnetic head.

FIG. 8 illustrates the variation of the strength of the Z-axis magnetic field component (Hz) measured along the Y-axis direction, i.e., along the crosstrack direction (the direction of traversing tracks of each recording medium), for 1.5 ns at each trailing edge (a 250 nm position in the X-axis direction) of the magnetic head according to this embodiment of the present invention and the first magnetic head.

In FIG. 8, a first graph G1A indicates a measurement result on the first magnetic head, and a second graph G2A indicates a measurement result on the magnetic head according to this embodiment.

Comparing the first and second graphs G1A and G2A to each other, the strength of the Z-axis direction magnetic field component (Hz) of the magnetic head according to this embodiment is greater than that of the first magnetic head, in other words, the strength of the Z-axis direction magnetic field component (Hz) of the magnetic head according to this embodiment of the present invention is more than 20% greater than that of the first magnetic head. While the magnetic field gradient in the center area of a selected track is almost the same as that in the first magnetic head or the magnetic head according to this embodiment of the present invention, the magnetic field gradient in the magnetic head according to this embodiment is gradually greater than the magnetic field gradient in the first magnetic head in the edge direction of the track.

In the magnetic head according to this embodiment of the present invention illustrated in FIG. 1, the recording magnetic field generated between the main pole P1 and the recording medium 44 is caused by a current flowing through the coil C wrapped around the main pole P1.

Thus, the result of FIG. 8 implies that the use of the magnetic head according to this embodiment of the present invention reduces the current required to generate the recording magnetic field as compared to the first magnetic head. In addition, considering that the width of the magnetic head according to this embodiment in the Y-axis direction (the width of the crosstrack direction) is about 100 nm and smaller than the width (120 nm) of the first magnetic head in the second simulation, the use of the magnetic head according to this embodiment increases the track density of a recording medium as compared to the first magnetic head. For example, if the first magnetic head is used for recording media whose track density is 180 k TPI (tracks per inch), the magnetic head according to this embodiment can be used for recording media having a track density more than 15% higher than 180 k TPI.

FIG. 9 illustrates the variation of the strength of the Z-axis magnetic field component (Hz) measured at a point (−230 nm, 0, −23 nm) between each main pole and each recording medium along the time.

In FIG. 9, a first graph G1B indicates a measurement result on the first magnetic head, and a second graph G2B indicates a measurement result on the magnetic head according to this embodiment of the present invention.

Comparing the first and second graphs G1B and G2B to each other, the strength of the Z-axis direction magnetic field component (Hz) at one point along the time is also greater in the magnetic head according to an embodiment of the present invention compared to the first magnetic head.

The present inventor performed a third simulation of the first magnetic head and magnetic heads according to other embodiments of the present invention having the magnetic shield devices 50A and 50B on both sides of the main pole P1 as illustrated in FIG. 3.

Figure 10:
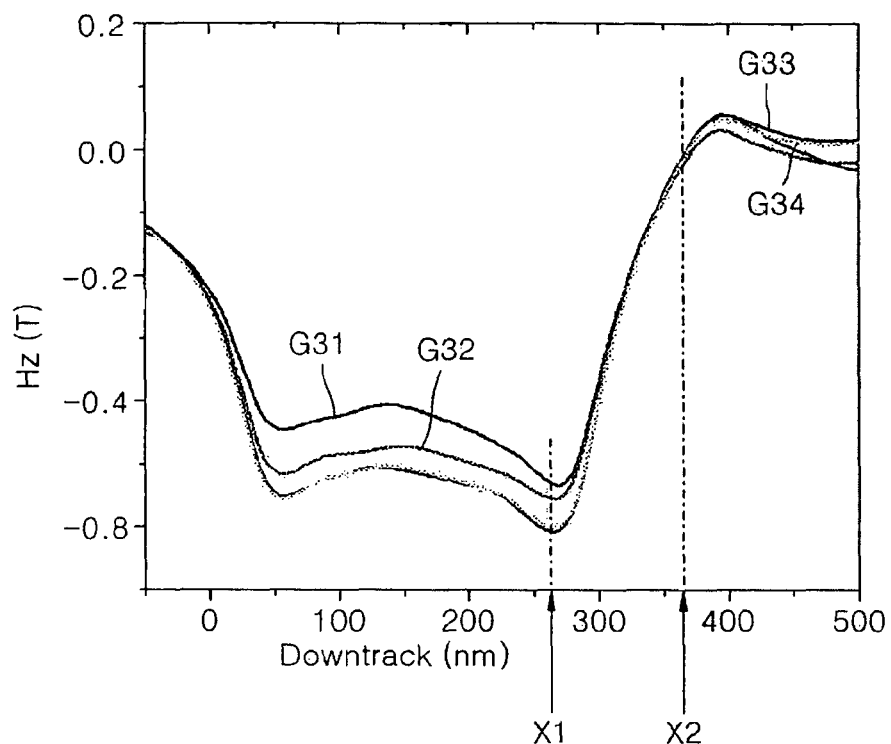
FIGS. 10 and 11 are diagrams illustrating results of a third simulation of the perpendicular magnetic recording heads according to exemplary embodiments of the present invention in which the magnetic shield devices are located at both sides of the main pole.
Figure 11:
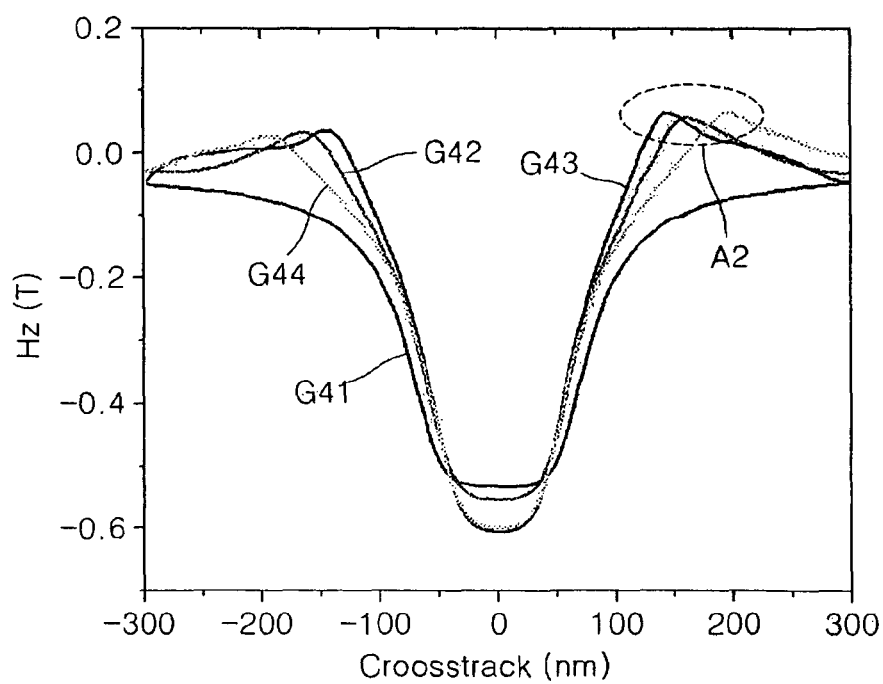

FIGS. 10 and 11 illustrate results of the third simulation.

FIG. 10 illustrates the variation in the X-axis direction of the strength of the Z-axis component (Hz) of the magnetic field generated between each main pole and each recording medium in the magnetic heads according to this embodiment and the first magnetic head.

In FIG. 10, a first graph G31 indicates a result of the third simulation of the first magnetic head, and second through fourth graphs G32, G33, and G34 indicate results of the third simulation of the magnetic heads according to other embodiments of the present invention. In detail, the second graph G32 indicates a result measured when the width D of the lower end of the main pole P1 of the magnetic head according to an embodiment is 100 nm and one magnetic shield layer is located at each of both sides of the main pole P1, the third graph G33 indicates a result measured when the width D of the lower end of the main pole P1 of the magnetic head according to an embodiment is 90 nm and one magnetic shield layer is located at each of both sides of the main pole P1, and the fourth graph G34 indicates a result measured when the width D of the lower end of the main pole P1 of the magnetic head according to an embodiment is 90 nm and two magnetic shield layers are located at each of both sides of the main pole P1. Here, a first position X1 corresponds to a trailing edge of each main pole, and a second position X2 corresponds to a position at which each return pole begins.

Comparing the first through fourth graphs G31 through G34 to each other, a difference of the strength of the Z-axis direction magnetic field component (Hz) between the first position X1 and the second position X2 (hereinafter, magnetic field strength difference) is greater than in the second through fourth graphs G32 through G34.

Comparing the second through fourth graphs G32 through G34 to each other, the magnetic field strength difference is greater than in the third and fourth graphs G33 and G34.

The magnetic field strength difference is almost the same in the third and fourth graphs G33 and G34.

The results of FIG. 10 imply that the magnetic field strength difference is greater in the magnetic heads according to embodiments of the present invention compared to the first magnetic head, and the magnetic field strength difference is greater if the width D of the lower end of the main pole P1 is smaller among the magnetic heads according to embodiments of the present invention. In addition, the results of FIG. 10 imply that it is meaningful to locate magnetic shield layers at both sides of the main pole P1, but the number of magnetic shield layers has little correlation with the magnetic field strength difference.

FIG. 11 illustrates the variation of the strength of the Z-axis component (Hz) of the magnetic field measured in the Y-axis direction (in the crosstrack direction of each recording medium) at each trailing edge of magnetic heads according to embodiments of the present invention and the first magnetic head. In FIG. 11, the strength of the Z-axis direction magnetic field component (Hz) was measured at the position 16 nm downward, apart from the air bearing surface of each magnetic head.

In FIG. 11, a first graph G41 indicates a result of the third simulation of the first magnetic head, and second through fourth graphs G42, G43, and G44 indicate results of the third simulation of the magnetic heads according to embodiments of the present invention.

Comparing the first through fourth graphs G41 through G44 to each other, the strength of the Z-axis direction magnetic field component (Hz) and the magnetic field gradient are greater in the second through fourth graphs G42 through G44 compared to the first graph G41.

Comparing the second through fourth graphs G42 through G44 to each other, the strength of the Z-axis direction magnetic field component (Hz) is greater in the third and fourth graphs G43 and G44 compared to the second graph G42. However, the strength of the Z-axis direction magnetic field component (Hz) is almost the same in the third and fourth graphs G43 and G44.

There exists a zone A2 in which the strength of the Z-axis direction magnetic field component (Hz) of each of the second through fourth graphs G42 through G44 is greater than 0, i.e., the Z-axis direction magnetic field component (Hz) is oriented in the positive (+) direction, thereby reducing or removing the gap G between the main pole P1 and the magnetic shield devices 50A and 50B.

The results of FIG. 11 imply that the magnetic field strength and the magnetic field gradient are also greater in the magnetic heads according to embodiments of the present invention having the magnetic shield devices 50A and 50B on both sides of the main pole P1 as illustrated in FIG. 3 as compared to the first magnetic head, and the use of the magnetic heads according to embodiments of the present invention can reduce a current required for recording data and increase track density compared to the use of the first magnetic head.

As described above, the width of the lower end of the main pole P1 of each magnetic head according to embodiments of the present invention is gradually reduced downward, and the main pole P1 includes first and second parts H1 and H2, each having a predetermined curvature. Accordingly, the strength and the gradient of a magnetic field between the second part H2 of the lower end of the main pole P1 and the recording medium 44 may be largely increased compared to those obtained from a magnetic head according to the prior art.

Thus, the use of a magnetic head according to the exemplary embodiments of the present invention may largely reduce the current required for recording data. In addition, a flux leakage due to a skew angle effect may be prevented or minimized. Accordingly, data may be recorded only on a selected track of a recording medium, and even if undesired data is recorded on unselected tracks, this may be minimized. In addition, linear bit density and track density may be increased.

While this invention has been particularly shown and described with reference to exemplary embodiments thereof, the above description should be considered in as illustrations of the exemplary embodiments only and are not for purposes of limitation. For example, it will be understood by those skilled in the art that a magnetic head according to exemplary embodiments of the present invention can include magnetic shield devices, e.g., magnetic shield layers, wrapped around the main pole P1. In addition, the first part H1 of the lower end of the main pole P1 illustrated in FIG. 2 cannot be curved but plane as illustrated in FIG. 5. In addition, the main pole P1 according to exemplary embodiments of the present invention can be applied to magnetic heads having different structures. Therefore, the scope of the invention is defined not by the detailed description of the invention but by the appended claims, and all differences within the scope will be construed as being included in the present invention.

What is claimed is:

1. A perpendicular magnetic recording head, comprising:
a data recording module comprising a main pole, a return pole, and a coil wrapped around the main pole; and
a data reproduction module comprising magnetic shield layers and a reading device located between the magnetic shield layers,
wherein the perpendicular magnetic recording head is configured to record recording information on a recording medium disposed in a downward direction from the perpendicular magnetic recording head,
wherein a width of a lower end of the main pole is gradually reduced in the downward direction, and the lower end of the main pole comprises a first part and a second part extending from the first part, the first part having a curved surface of a first curvature and the second part having a curved surface of a second curvature, and
wherein the first curvature is such that the width of the first part decreases at a decreasing rate in a direction approaching the second part from the first part.

2. The perpendicular magnetic recording head of claim 1, further comprising magnetic shield devices disposed on both sides of the lower end of the main pole.

3. The perpendicular magnetic recording head of claim 1, wherein the first curvature is equal to the second curvature.

4. The perpendicular magnetic recording head of claim 1, wherein the first curvature is different from the second curvature.

5. The perpendicular magnetic recording head of claim 1, wherein the width of the lower end of the second part is below 100 nm.

6. The perpendicular magnetic recording head of claim 1, wherein the first part and the second part are either the same or different magnetic materials.

7. The perpendicular magnetic recording head according to claim 1, wherein the lower end of the main pole is non-continuously reduced in a downward direction perpendicular to the recording media.

8. A perpendicular magnetic recording head comprising:
a data recording module comprising a main pole, a return pole, and a coil wrapped around the main pole; and
a data reproduction module comprising magnetic shield layers and a reading device located between the magnetic shield layers,
wherein a width of a lower end portion of the main pole narrows along a downward direction approaching a lower end surface of the main pole,
wherein the lower end of the main pole comprises a first part and a second part extending from the first part, the first part having a curved surface of a first curvature and the second part having a curved surface of a second curvature, and
wherein the first curvature is such that the width of the first part decreases at a decreasing rate in a direction approaching the second part from the first part.

9. The perpendicular magnetic recording head of claim 8, wherein the second part is disposed in the downward direction from the first part.

10. The perpendicular magnetic recording head of claim 8, further comprising magnetic shield devices disposed on both sides of the lower end of the main pole.

11. The perpendicular magnetic recording head of claim 8, wherein the first curvature is equal to the second curvature.

12. The perpendicular magnetic recording head of claim 8, wherein the first curvature is different from the second curvature.

13. The perpendicular magnetic recording head of claim 8, wherein the width of the lower end of the second part is below 100 nm.

14. The perpendicular magnetic recording head of claim 8, wherein the first part and the second part are either the same or different magnetic materials.

15. A perpendicular magnetic recording head, comprising:
a data recording module comprising a main pole, a return pole, and a coil wrapped around the main pole; and
a data reproduction module comprising magnetic shield layers and a reading device located between the magnetic shield layers,
wherein the perpendicular magnetic recording head is configured to record recording information on a recording medium disposed in a downward direction from the perpendicular magnetic recording head,
wherein a width of a lower end of the main pole is gradually reduced in the downward direction, and the lower end of the main pole comprises a first part and a second part extending from the first part, the first part having a curved surface of a first curvature and the second part having a curved surface of a second curvature, and
wherein the curved surface of the first part directly adjoins the curved surface of the second part.

16. The perpendicular magnetic recording head of claim 15, wherein the first curvature is such that the width of the first part decreases at a decreasing rate in a direction approaching the second part from the first part.

17. The perpendicular magnetic recording head of claim 15, wherein the first curvature is different from the second curvature.

18. The perpendicular magnetic recording head of claim 15, wherein the width of the lower end of the second part is below 100 nm.

* * * * *